US012467282B2

(12) United States Patent
Niegmann et al.

(10) Patent No.: US 12,467,282 B2
(45) Date of Patent: Nov. 11, 2025

(54) ACTUATING DEVICE FOR LOCK DEVICE, AND LOCK DEVICE

(71) Applicant: ASSA ABLOY AB, Stockholm (SE)

(72) Inventors: Kaj Niegmann, Hägersten (SE); Johan Von Matern, Täby (SE)

(73) Assignee: ASSA ABLOY AB, Stockholm (SE)

( * ) Notice: Subject to any disclaimer, the term of this patent is extended or adjusted under 35 U.S.C. 154(b) by 197 days.

(21) Appl. No.: 18/558,585

(22) PCT Filed: Apr. 19, 2022

(86) PCT No.: PCT/EP2022/060265
§ 371 (c)(1),
(2) Date: Nov. 2, 2023

(87) PCT Pub. No.: WO2022/233568
PCT Pub. Date: Nov. 10, 2022

(65) Prior Publication Data

US 2024/0218702 A1 Jul. 4, 2024

(30) Foreign Application Priority Data

May 4, 2021 (SE) .................................... 2150566-4

(51) Int. Cl.
*E05B 47/00* (2006.01)
*E05B 47/06* (2006.01)

(52) U.S. Cl.
CPC ...... *E05B 47/0615* (2013.01); *E05B 47/0673* (2013.01); *E05B 47/068* (2013.01); *E05B 2047/002* (2013.01)

(58) Field of Classification Search
CPC .. E05B 47/00; E05B 47/0615; E05B 47/0673; E05B 47/068; E05B 2047/002;
(Continued)

(56) References Cited

U.S. PATENT DOCUMENTS 6,158,259 A 12/2000 Schmitz et al.
7,908,896 B1 3/2011 Olson et al.
(Continued)

FOREIGN PATENT DOCUMENTS

CN 206360487 U * 7/2017
CN 107905668 A * 4/2018 ............ E05F 15/603
(Continued)

OTHER PUBLICATIONS

"PCTEP2022060265 Office Action mailed Dec. 23, 2021", (Dec. 23, 2021), 9 pages.
(Continued)

*Primary Examiner* — Suzanne L Barrett
(74) *Attorney, Agent, or Firm* — Schwegman Lundberg & Woessner, P.A.

(57) ABSTRACT

An actuating device (12*a*, 12*b*, 12*c*) for a lock device (10) comprising a stationary structure (90) having a credential receiver (40) for receiving a credential input (42) from a user; an actuating element (16) rotatable about an actuation axis (18) relative to the stationary structure by direct manipulation by the user, where the stationary structure is arranged at least partly inside the actuating element; a locking member (24) movable between a locked position (106) and an unlocked position (no); and an electromechanical transfer device (y2*a*-y2*c*) arranged, based on the credential input, to adopt a disabled state (104), in which the locking member cannot be moved from the locked position to the unlocked position by rotation of the actuating element, and an enabled state (108) in which the locking member can be moved from the locked position to the unlocked position by rotation of the actuating element; wherein the credential receiver is at least partly arranged radially inside the actuating element with respect to the actuation axis.

17 Claims, 12 Drawing Sheets

(58) Field of Classification Search
CPC .......................... Y10T 70/709; Y10T 70/7096; Y10T 70/7068
USPC ........................................................ 70/278.7
See application file for complete search history.

(56) References Cited

U.S. PATENT DOCUMENTS

| | | | | |
|---|---|---|---|---|
| 8,272,240 B1 * | 9/2012 | Schilens | E05B 73/007 70/210 |
| 8,689,594 B2 * | 4/2014 | Yanar | G07C 9/00944 70/279.1 |
| 2009/0211319 A1 | 8/2009 | Mccormack | |
| 2015/0096341 A1 * | 4/2015 | Overgaard | E05B 47/02 70/283.1 |

FOREIGN PATENT DOCUMENTS

| | | | | |
|---|---|---|---|---|
| CN | 110017064 A * | 7/2019 | E05B 47/0012 |
| DE | 19824713 A1 * | 12/1999 | E05B 47/0615 |
| DE | 19919283 A1 * | 12/1999 | E05B 47/0649 |
| DE | 102004017664 | 10/2005 | |
| EP | 0962612 | 12/1999 | |
| EP | 3693526 | 8/2020 | |
| WO | WO-2017114534 A1 * | 7/2017 | E05B 47/026 |
| WO | 2022233568 | 11/2022 | |

OTHER PUBLICATIONS

"PCTEP2022060265 International Search Report mailed Aug. 23, 2022", 4 pages.
"PCTEP2022060265 Written Opinion mailed Aug. 23, 2022", 8 pages.
"PCTEP2022060265 International Preliminary Report on Patentability mailed Dec. 7, 2022", 38 pages.
"PCTEP2022060265 Final Notice mailed Dec. 13, 2022", 42 pages.
"PCTEP2022060265 Intention to Grant mailed Feb. 15, 2023", 3 pages.

* cited by examiner

ACTUATING DEVICE FOR LOCK DEVICE, AND LOCK DEVICE

CROSS-REFERENCE TO RELATED APPLICATION(S)

This application is a national stage application under 35 U.S.C. § 371 of PCT Appl. No. PCT/EP2022/060265, titled "Actuating Device for Lock Device, and Lock Device," filed Apr. 19, 2022, which claims priority to Swedish Patent Appl. No. 2150566-4, filed May 4, 2021, each of which is incorporated herein by reference in its entirety.

TECHNICAL FIELD

The present disclosure generally relates to an actuating device for a lock device. In particular, an actuating device comprising a manually rotatable actuating element, and a lock device comprising an actuating device, are provided.

BACKGROUND

A digital cylinder may comprise a lock cylinder, a rotatable plug inside the lock cylinder and a knob for rotating the plug. A clutching mechanism and electronics for controlling the clutching mechanism may be arranged inside the plug. A credential receiver may be provided at a front end of the knob. When the knob rotates, the credential receiver, the clutching mechanism and the electronics also rotate together with the knob. This causes an orientation problem of the credential receiver. For example, in case a fingerprint sensor is incorrectly oriented, an authorization process may take longer time or may result in read failures. In order to avoid the above orientation problem, some lock devices comprise a static credential receiver positioned next to the knob, such as in an escutcheon.

EP 0787874 B1 discloses an electronic door lock comprising a knob and a keypad distanced from the knob.

SUMMARY

One object of the present disclosure is to provide an actuating device for a lock device, which actuating device enables an improved user experience.

A further object of the present disclosure is to provide an actuating device for a lock device, which actuating device enables a more consistent user experience.

A still further object of the present disclosure is to provide an actuating device for a lock device, which actuating device enables an improved interaction between a user and the actuating device.

A still further object of the present disclosure is to provide an actuating device for a lock device, which actuating device enables a user to more reliably provide a credential input.

A still further object of the present disclosure is to provide an actuating device for a lock device, which actuating device has a compact design.

A still further object of the present disclosure is to provide an actuating device for a lock device, which actuating device solves several or all of the foregoing objects in combination.

A still further object of the present disclosure is to provide a lock device comprising an actuating device, which lock device solves one, several or all of the foregoing objects.

According to a first aspect, there is provided an actuating device for a lock device, the actuating device comprising a stationary structure having a credential receiver for receiving a credential input from a user; an actuating element rotatable about an actuation axis relative to the stationary structure by direct manipulation by the user, where the stationary structure is arranged at least partly inside the actuating element; a locking member movable between a locked position and an unlocked position; and an electromechanical transfer device arranged, based on the credential input, to adopt a disabled state, in which the locking member cannot be moved from the locked position to the unlocked position by rotation of the actuating element, and an enabled state in which the locking member can be moved from the locked position to the unlocked position by rotation of the actuating element; wherein the credential receiver is at least partly arranged radially inside the actuating element with respect to the actuation axis.

The actuating device thus has a static credential receiver arranged at least partly inside the actuating element, such as at least partly inside a knob. This contributes to a compact design of the actuating device. When the actuating element rotates, the credential receiver remains static. The actuating device thereby also provides a consistent user experience.

A major portion of the credential receiver may be arranged radially inside the actuating element with respect to the actuation axis. For example, the credential receiver may be arranged entirely radially inside the actuating element with respect to the actuation axis.

Alternatively, or in addition, a major length of the credential receiver along the actuation axis, such as the entire length of the credential receiver along the actuation axis, may be arranged radially inside the actuating element. A length of the credential receiver is thus a dimension of the credential receiver along the actuation axis or parallel with the actuation axis.

The credential receiver provides a credential interface between the user and the actuating device. The credential receiver may be of a wide range of types. The credential receiver may for example comprise a biometric sensor, a keypad, a display and/or an antenna. In case the credential receiver comprises a biometric sensor, the credential input may be various types of biometric traits of a person, such as fingerprint, iris, face and/or voice. In case the credential receiver comprises a keypad or a display, the credential input may be a code input by a person to the keypad or the display. In case the credential receiver comprises an antenna, the credential input may be a wireless signal from a wireless key device, such as an RFID (radio-frequency identification) card or a mobile phone. In any case, the credential receiver may be configured to issue an access signal in response to the credential input. The access signal may then be evaluated by a control system of the actuating device. Due to the stationary structure inside the actuating element, the actuating device enables various types of credential receivers to be easily installed in the actuating device.

With direct manipulation of the actuating element is meant that the user can physically contact the actuating element directly. The user may for example grab and rotate the actuating element.

The transfer device may comprise an input element and an output element. The input element may be driven to rotate by rotation of the actuating element. The output element may be fixed to, or integrally formed with, the locking member.

The transfer device may for example be a coupling device or a blocking device. In case the transfer device is a coupling device, the input element may be decoupled from the output element in the disabled state and may be coupled to the output element in the enabled state. Thus, in case the transfer device is a coupling device, the actuating element can always be rotated. In case the transfer device is a blocking device, the input element may be fixed to, or integrally formed with, the output element. The input element may be blocked in the disabled state and may be unblocked in the enabled state. Thus, in case the transfer device is a blocking device, the actuating element can only be rotated when the transfer device adopts the enabled state. The disabled state and the enabled state may alternatively be referred to as a locked state and an unlocked state, respectively.

The actuating device may further comprise a lock cylinder. In this case, the lock cylinder may form part of the stationary structure. The transfer device may be provided in the lock cylinder. Static components inside the actuating element may be secured to the lock cylinder, e.g. by one or more fasteners, such as screws. The actuating element may comprise a cavity for accommodating the stationary structure, or a part of the stationary structure, therein.

The stationary structure may or may not be stationary in space. The stationary structure may for example be fixed to an access member, such as a door, which is movable in space.

The actuating device may further comprise a transfer wheel rotatable about a transfer axis parallel with the actuation axis. The transfer wheel may be positioned radially inside the actuating element with respect to the actuation axis. In this case, the transfer wheel may be arranged to drive an input element of the transfer device. Furthermore, the actuating element may comprise an internal profile engaging the transfer wheel.

The internal profile may be circular. A diameter of the transfer wheel may be at least 20%, such as at least 40%, of a diameter of the internal profile. Alternatively, or in addition, the diameter of the transfer wheel may be less than 90%, such as less than 70%, of the diameter of the internal profile. In this way, stationary components, such as cables and fasteners, can pass through the internal profile without interfering with the movements of the internal profile and the transfer wheel. Thus, the transfer wheel can transmit a movement of the actuating element to a movement of the transfer device (e.g. the input element thereof) at the same time as the stationary structure passes through the internal profile, i.e. through a space inside the internal profile.

The internal profile may be concentric with the actuation axis. The transfer axis may be stationary.

The input element may be rotatable. In this case, the transfer wheel may be fixed to, or integrally formed with, the input element. Alternatively, the actuating device may comprise a transmission between the transfer wheel and the input element. In this case, the input element does not have to move by rotation.

The actuating device may further comprise a second wheel rotatable about a second axis and a third wheel rotatable about a third axis. In this case, each of the second axis and the third axis may be parallel with the actuation axis, and each of the second wheel and the third wheel may be positioned radially inside the actuating element with respect to the actuation axis. Furthermore, the internal profile may engage each of the second wheel and the third wheel.

The transfer wheel may be larger than the second wheel. The transfer wheel may be made as large as possible in view of the needed area for the stationary structure through the internal profile and the second wheel may be made as small as possible. In this way, the input element can rotate relatively slowly and the second wheel can rotate relatively fast (e.g. to drive a generator) for a given rotational speed of the actuating element. When the actuating device comprises the three wheels, the third wheel centers the actuating element with respect to the actuation axis. Each of the second axis and the third axis may be stationary.

Since the internal profile engages each of the three wheels, the actuating element is supported by the three wheels. The support of the actuating element on three wheels reduces the friction counteracting the rotation of the actuating element, for example in contrast to a large support wheel having an external diameter corresponding to the internal diameter of the internal profile.

The transfer wheel may alternatively be referred to as a first wheel. The first wheel, the second wheel and the third wheel may lie in a common plane perpendicular to the actuation axis. The first wheel, the second wheel and the third wheel may provide the only support of the actuating element in radial directions with respect to the actuation axis.

The provision of three wheels each engaging the internal profile in a common plane results in spaces inside the internal profile between the wheels. These spaces can be used for passing one or more static components of the stationary structure therethrough, for example one or more screws fixing the credential receiver to the lock cylinder.

According to an alternative example, the actuating device comprises only the first wheel and the second wheel, but not the third wheel. According to a further alternative example, the actuating device comprises only the first wheel, but not the second wheel and the third wheel.

One, several or all of the transfer wheel, the second wheel and the third wheel may be a gear wheel. In this case, the internal profile may comprise an internal gear meshing with the one or more gear wheels. In this way, the actuating device comprises a gear train. The one or more gear wheels and the internal gear may be spur gears. The teeth of the internal gear face radially inwards with respect to the actuation axis. The actuating element may comprise a ring gear comprising the internal profile with the internal gear.

As an alternative to gear wheels and an internal profile comprising an internal gear, each wheel may be a friction wheel and the internal profile may comprise a friction surface frictionally engaging each of the one or more friction wheels. Such frictional surfaces may for example comprise rubber.

The actuating element may comprise a knob. The knob may be cylindrical and/or hollow. Alternatively, or in addition, the internal profile may be fixed to the knob. For example, the ring gear may be fixed to the knob. The internal profile may be provided in a rear region of the knob, such as within 20% of a length of the knob along the actuation axis from a rear end of the knob. A diameter of the internal profile may be at least 50%, such as at least 70%, of an external diameter of the knob.

The actuating element may comprise a front end. In this case, the credential receiver may be substantially aligned with, or aligned with, the front end. In this way, the actuating device can provide a static front face. A substantial alignment may include offsetting a front side of the credential receiver less than 10% of the length of the knob from the front end.

The actuating device may further comprise a control system. The control system may be configured to issue an authorization signal to the transfer device upon presentation of a valid credential input by the user. The control system may be arranged in the stationary structure. In this way, the control system does not rotate together with any of the actuating element, the transfer wheel, the input element, the output element or the locking member. The control system may be arranged inside the actuating element.

The transfer device may comprise an electromagnetic actuator. The authorization signal from the control system may be sent to the actuator.

The control system may be configured to evaluate the access signal from the credential receiver and to issue the authorization signal based on the evaluation of the access signal. For example, in case the user presents a valid credential input, the control system may issue an authorization signal to the transfer device causing the transfer device to adopt the enabled state. In case the user presents an invalid credential input, or does not present any credential input at all, the control system may not issue the authorization signal to the transfer device. In this case, the transfer device remains in the enabled state.

The control system may comprise at least one data processing device and at least one memory having at least one computer program stored thereon, the at least one computer program comprising program code which, when executed by the at least one data processing device, causes the at least one data processing device to perform, or command performance of, various steps as described herein. For example, the at least one computer program may comprise program code which, when executed by the at least one data processing device, causes the at least one data processing device to provide an access signal from the credential receiver, evaluate the access signal, and issue the authorization signal upon concluding that the access signal represents a valid credential input.

The actuating device may further comprise a power source.

The transfer device may be arranged to be electrically powered by the power source. For example, the actuating device may comprise one or more electrical cables interconnecting the power source and the transfer device.

The power source may be arranged in the stationary structure. The power source may for example be arranged inside the actuating element.

The power source may comprise an electric generator arranged to be driven by rotation of the actuating element to thereby generate electric energy. In addition to the generator, the power source may comprise a battery and/or a capacitor. Alternatively, or in addition, the actuating device may comprise a speed increasing transmission between the actuating element and the generator.

The generator may be arranged to be driven by rotation of the transfer wheel. In this case, the actuating element may rotate endlessly about the actuation axis for energy harvesting.

In this variant, the transfer wheel can drive both the generator and the input element. In case the second wheel and/or the third wheel are provided, these wheels provide support for the actuating element. As an alternative, the generator may be arranged to be driven by rotation of the second wheel.

The generator may comprise a generator axis. In this case, the generator axis may be angled 30 degrees to 150 degrees to the actuation axis. The generator axis may for example be angled 80 degrees to 100 degrees, such as 90 degrees, to the actuation axis. The generator may comprise a stator and a rotor rotatable relative to the stator about the generator axis. The rotor may be rotationally driven about the generator axis by the transfer wheel or by the second wheel.

The actuating device of this variant may comprise a first bevel gear and a second bevel gear, meshing with the first bevel gear. The first bevel gear may be rotationally driven by the transfer wheel or by the second wheel. The first bevel gear may rotate about a first bevel gear axis parallel with, or concentric with, the actuation axis. In some variants, the first bevel gear is fixed to, or integrally formed with, the transfer wheel or the second wheel. The second bevel gear may rotate about the generator axis.

The first bevel gear may be larger than the second bevel gear. In this way, one example of a speed increasing transmission between the actuating element and the generator is provided.

In case the power source does not comprise a generator, the power source may comprise a battery inside stationary structure, such as inside the actuating element. Alternatively, the power source may be external to the actuating device, e.g. comprising a mains power supply. When the power source does not comprise a generator, the actuating element does not have to be configured to rotate endlessly about the actuation axis. It may in this case be sufficient if the actuating element can rotate 90 degrees or less about the actuation axis. This in turn enables more space inside the internal profile to be used for the stationary structure. As a consequence, the actuating device can be made more compact.

In case the actuating element can rotate only 90 degrees about the actuation axis as mentioned above, the actuating element may comprise a 270 degrees sector (in a plane transverse to the actuation axis) that can be occupied by the stationary structure.

If the power source does not comprise a generator, the actuating element may be fixed to the input element of the transfer device. In this case, no wheels need to be used. The input element may then also be rotatable about the actuation axis.

According to a second aspect, there is provided a lock device comprising an actuating device according to the first aspect.

According to a third aspect, there is provided an access member comprising a lock device according to the second aspect. The access member may be a door.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
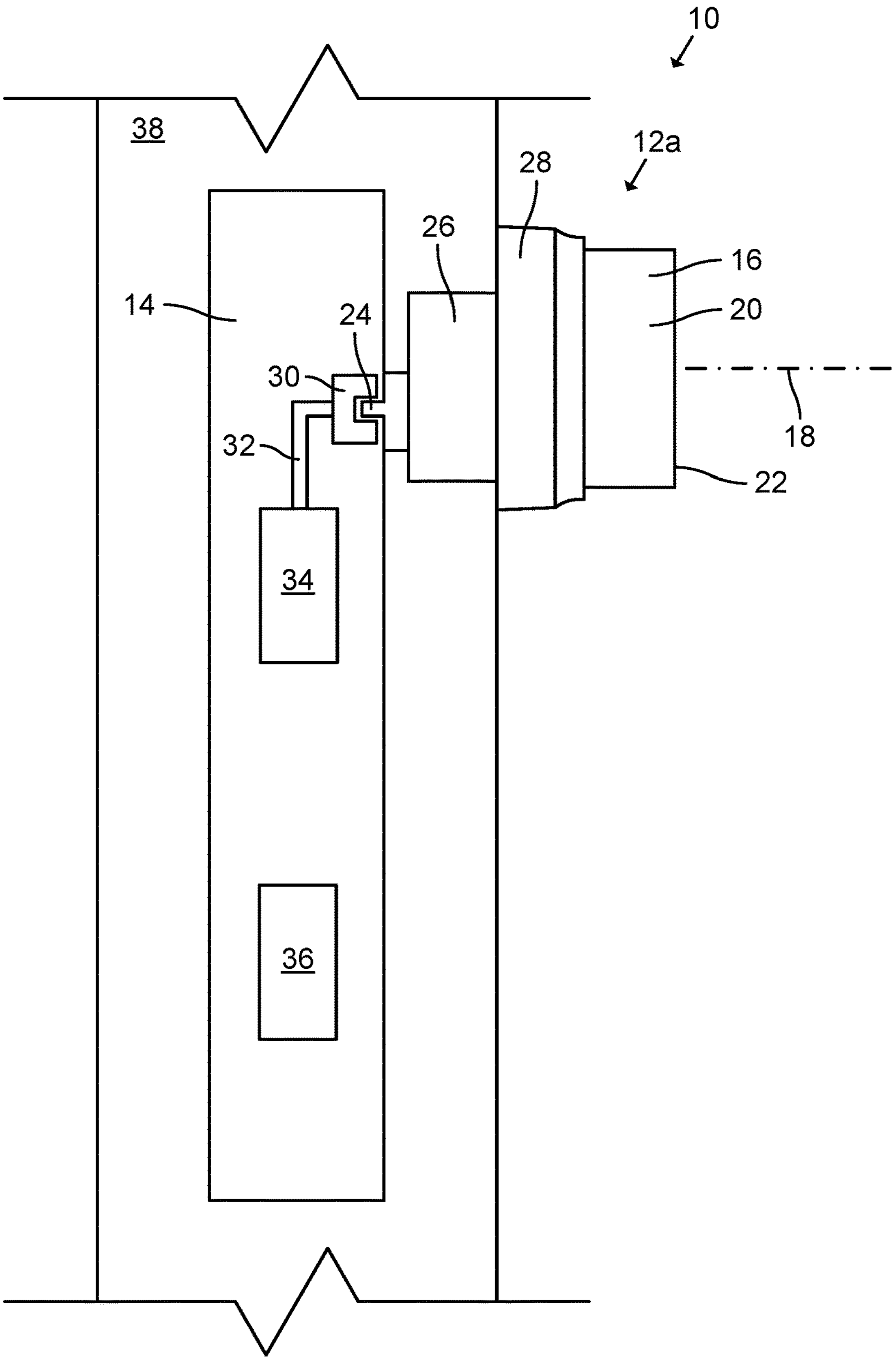
FIG. 1: schematically represents a side view of a lock device comprising one example of an actuating device.

In the following, an actuating device comprising a manually rotatable actuating element, and a lock device comprising an actuating device, will be described. The same or similar reference numerals will be used to denote the same or similar structural features.

FIG. 1 schematically represents a side view of a lock device 10. The lock device 10 comprises an actuating device 12*a*. The lock device 10 of this example further comprises a lock case 14.

The actuating device 12*a* comprises an actuating element 16. The actuating element 16 is rotatable about an actuation axis 18. A user may for example grab and rotate the actuating element 16.

The actuating element 16 of this example comprises a hollow cylindrical knob 20. The actuating element 16 further comprises a front end 22.

The actuating device 12*a* further comprises a locking member 24. The locking member 24 of this example is rotatable between a locked position and an unlocked position.

The actuating device 12*a* of this example further comprises a lock cylinder 26. The locking member 24 here protrudes rearwardly from the lock cylinder 26.

The actuating device 12*a* of this example further comprises a rosette 28. The lock cylinder 26 and the rosette 28 for part of one example of a stationary structure of the actuating device 12*a*.

The lock case 14 of this example comprises a spindle 30, an arm 32, a dead bolt 34 and a latch bolt 36. The lock case 14 is provided inside a door 38. The rosette 28 mates with an outer surface of the door 38. The stationary structure is fixed to the door 38. Thus, the stationary structure is stationary with respect to the door 38 but may move in space as the door 38 moves.

The locking member 24 provides an interface to the lock case 14. Rotation of the locking member 24 from the locked position to the unlocked position causes the spindle 30 to rotate and the dead bolt 34 to be retracted by means of the arm 32. In this way, the dead bolt 34 can be retracted from a strike plate in a door frame (not shown) and the door 38 can be opened.

Figure 2A:
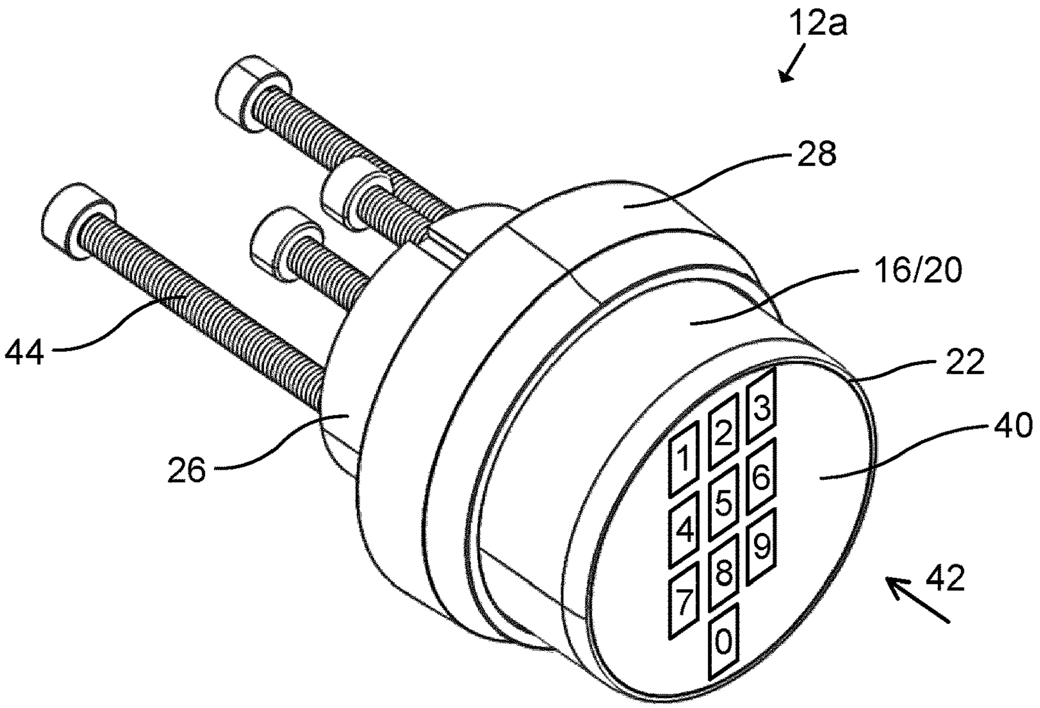
FIG. 2*a*: schematically represents a front perspective view of the actuating device.
Figure 2B:
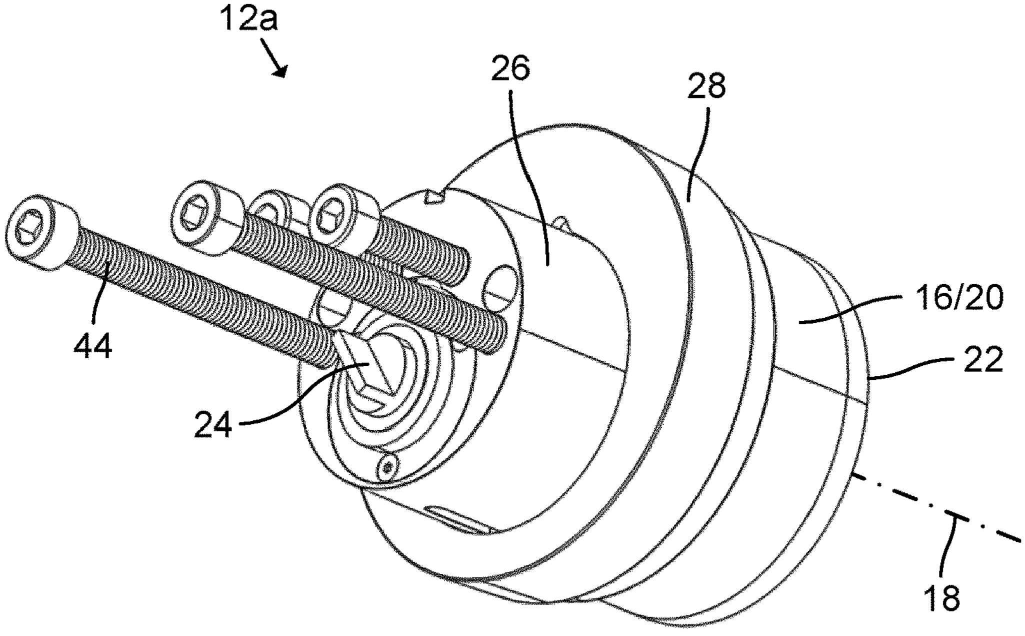
FIG. 2*b*: schematically represents a rear perspective view of the actuating device.

FIG. 2*a* schematically represents a front perspective view of the actuating device 12*a*, and FIG. 2*b* schematically represents a rear perspective view of the actuating device 12*a*. With collective reference to FIGS. 2*a* and 2*b*, the actuating device 12*a* further comprises a credential receiver 40. The user can provide a credential input 42 to the credential receiver 40. The credential receiver 40 of this example is a keypad and the credential input 42 of this example is a code. Many alternative types of credential receivers 40 are known as such.

The credential receiver 40 is stationary and forms part of the stationary structure of the actuating device 12*a*. The actuating element 16 is rotatable relative to the stationary credential receiver 40.

The credential receiver 40 is in this example arranged entirely radially inside the knob 20 with respect to the actuation axis 18. Furthermore, as shown in FIG. 2*a*, a front side of the credential receiver 40 is flush with the front end 22 of the knob 20 in this example.

FIGS. 2*a* and 2*b* further show that the actuating device 12*a* of this example comprises a plurality of screws 44. The screws 44 pass through the lock cylinder 26. The screws 44 are used to secure the credential receiver 40 and other static components inside knob 20 to the lock cylinder 26.

Figure 3:
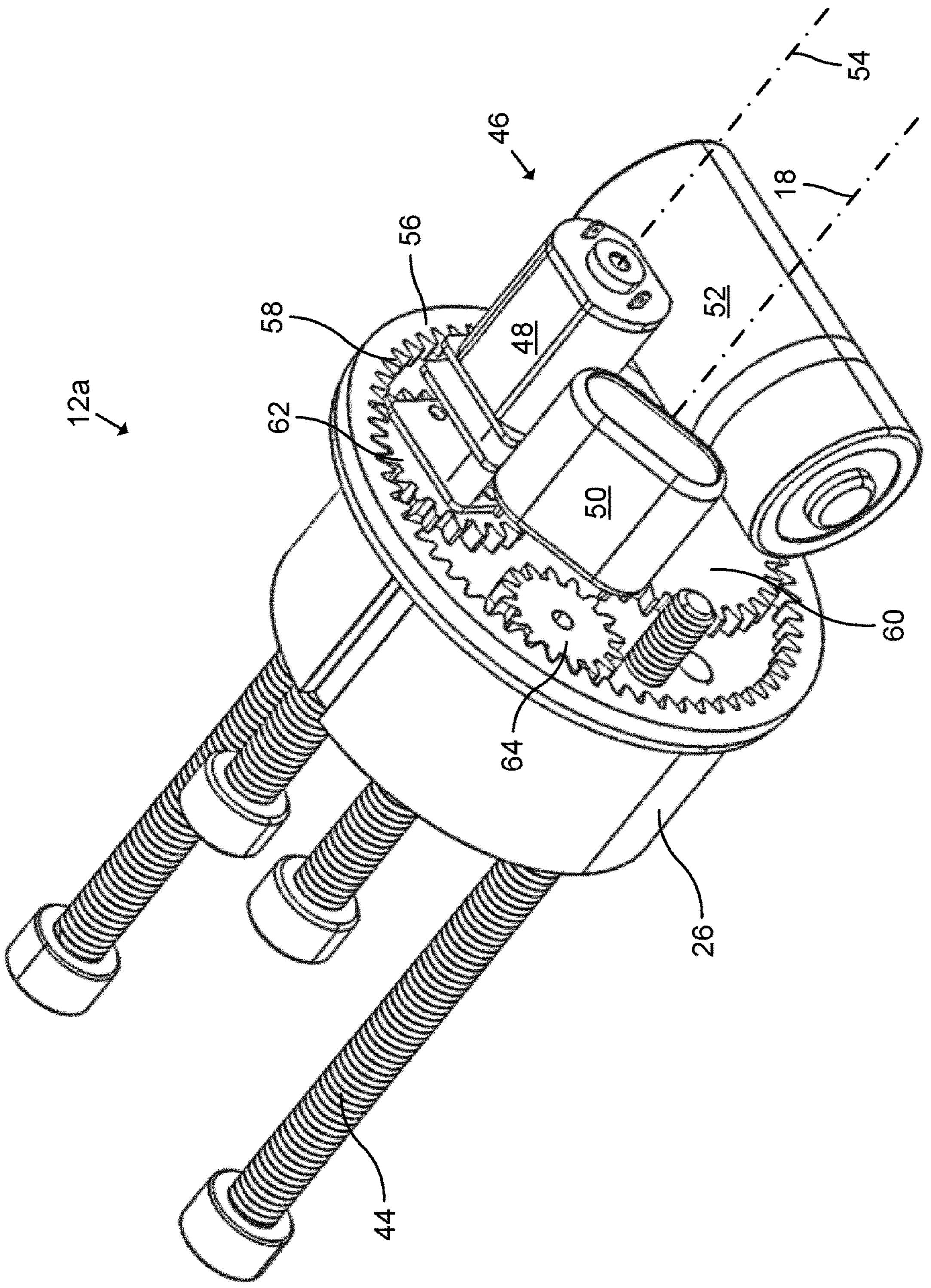
FIG. 3: schematically represents a partial front perspective view of the actuating device.

FIG. 3 schematically represents a partial front perspective view of the actuating device 12*a*. As shown in FIG. 3, the actuating device 12*a* further comprises a power source 46. The power source 46 forms part of the stationary structure of the actuating device 12*a* and is arranged inside the knob 20. The power source 46 of this example comprises a an electric generator 48, a capacitor 50 and a battery 52.

The generator 48 comprises a stator and a rotor rotatable relative to the stator about a generator axis 54. In this example, the generator axis 54 is parallel with, and offset from, the actuation axis 18.

The actuating device 12*a* further comprises a ring gear 56. The ring gear 56 is fixed to the knob 20 and constitutes a part of the actuating element 16. The ring gear 56 is concentric with the actuation axis 18.

The ring gear 56 comprises a toothed internal profile 58 facing towards the actuation axis 18. The internal profile 58 is thus here exemplified as an internal gear. An inner diameter of the ring gear 56 (within top lands of the toothed internal profile 58) is larger than an outer diameter of the lock cylinder 26.

The actuating device 12*a* further comprises a transfer wheel 60. The transfer wheel 60 may alternatively be referred to as a first wheel. The transfer wheel 60 is arranged inside the ring gear 56. The transfer wheel 60 is here a spur gear in meshing engagement with the internal profile 58.

The actuating device 12*a* of this example further comprises a second wheel 62 and a third wheel 64. Each of the second wheel 62 and the third wheel 64 is arranged inside the ring gear 56. Moreover, each of the second wheel 62 and the third wheel 64 is here a spur gear in meshing engagement with the internal profile 58. The transfer wheel 60, the second wheel 62 and the third wheel 64 provide the only support for the actuating element 16 in radial directions with respect to the actuation axis 18.

Figure 4:
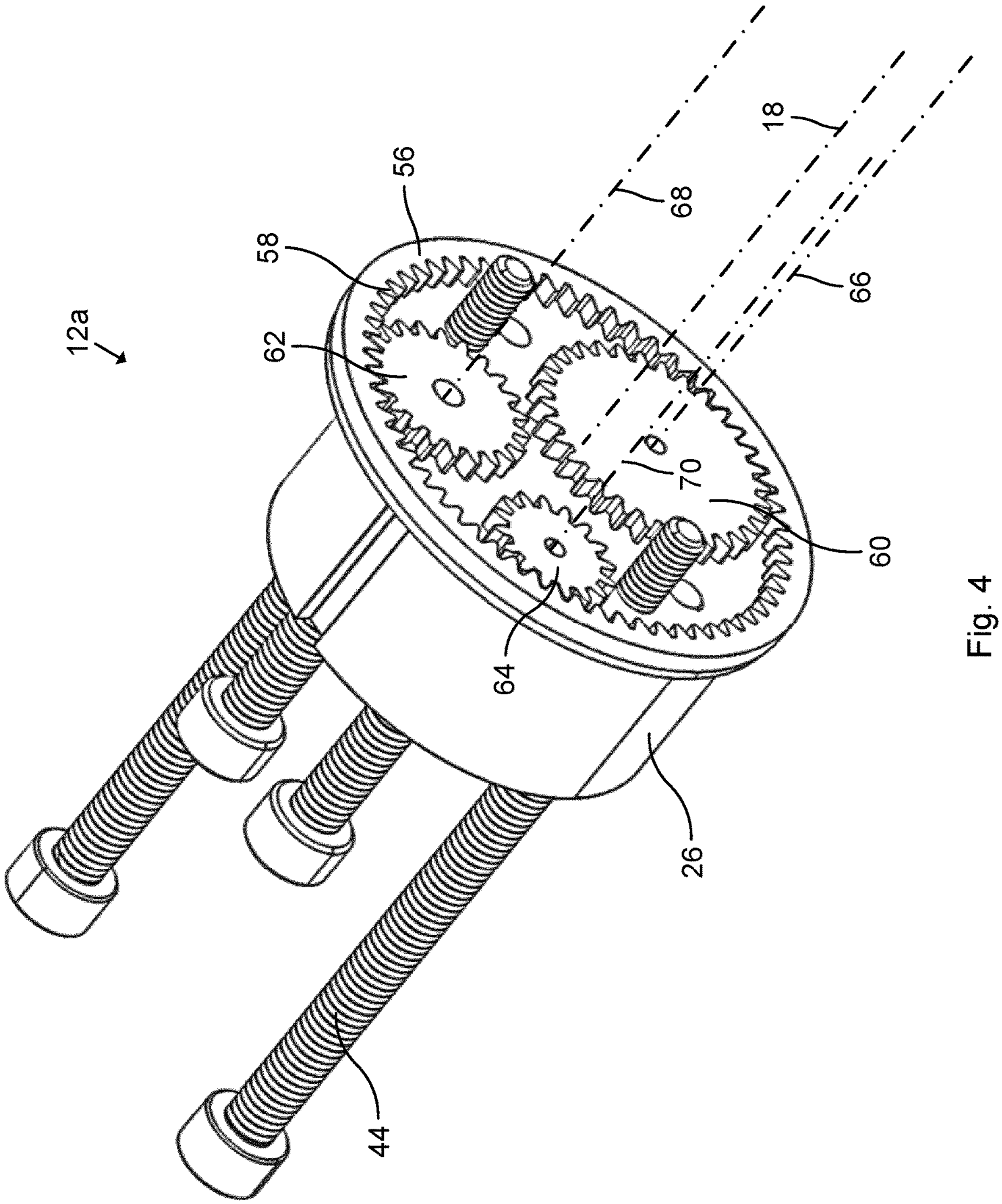
FIG. 4: schematically represents a further partial front perspective view of the actuating device.

FIG. 4 schematically represents a further partial front perspective view of the actuating device 12*a*. As shown in FIG. 4, the transfer wheel 60 is rotatable about a transfer axis 66. The transfer axis 66 may alternatively be referred to as a first axis. The transfer axis 66 is parallel with, and offset from, the actuation axis 18.

The second wheel 62 is rotatable about a second axis 68 and the third wheel 64 is rotatable about a third axis 70. Each of the second axis 68 and the third axis 70 is parallel with, and offset from, the actuation axis 18. The second axis 68 is concentric with the generator axis 54.

In this example, the actuating element 16 can rotate endlessly around the actuation axis 18. When the actuating element 16 is rotated, the transfer wheel 60, the second wheel 62 and the third wheel 64 are driven to rotate about the transfer axis 66, the second axis 68 and the third axis 70, respectively. Rotation of the second wheel 62 drives the generator 48, either directly or via a speed increasing transmission, to harvest electric energy.

A diameter of the transfer wheel 60 is here approximately 50% of a diameter of the internal profile 58. A diameter of the second wheel 62 is here approximately 35% of the diameter of the internal profile 58. A diameter of the third wheel 64 is here approximately 25% of the diameter of the internal profile 58. The transfer wheel 60 is thus larger than the second wheel 62. Moreover, the second wheel 62 is larger than the third wheel 64. Each wheel 60, 62 and 64 may have a thickness (i.e. a dimension along the actuation axis 18) of 1 mm to 3 mm, such as 2 mm.

The relatively small size of the second wheel 62 contributes to a higher rotational speed of the generator 48. The relatively large size of the transfer wheel 60 contributes to a relatively low rotational speed thereof. The function of the third wheel 64 is here to support the actuating element 16 and to center the actuating element 16 with respect to the actuation axis 18.

As shown in FIG. 4, a continuous space is formed inside the internal profile 58 and between the wheels 60, 62 and 64. This space is used for the stationary structure of the actuating device 12*a*. Some or all of the screws 44 and/or electric cables can pass through this space without interfering with the ring gear 56 or the wheels 60, 62 and 64.

Figure 5:
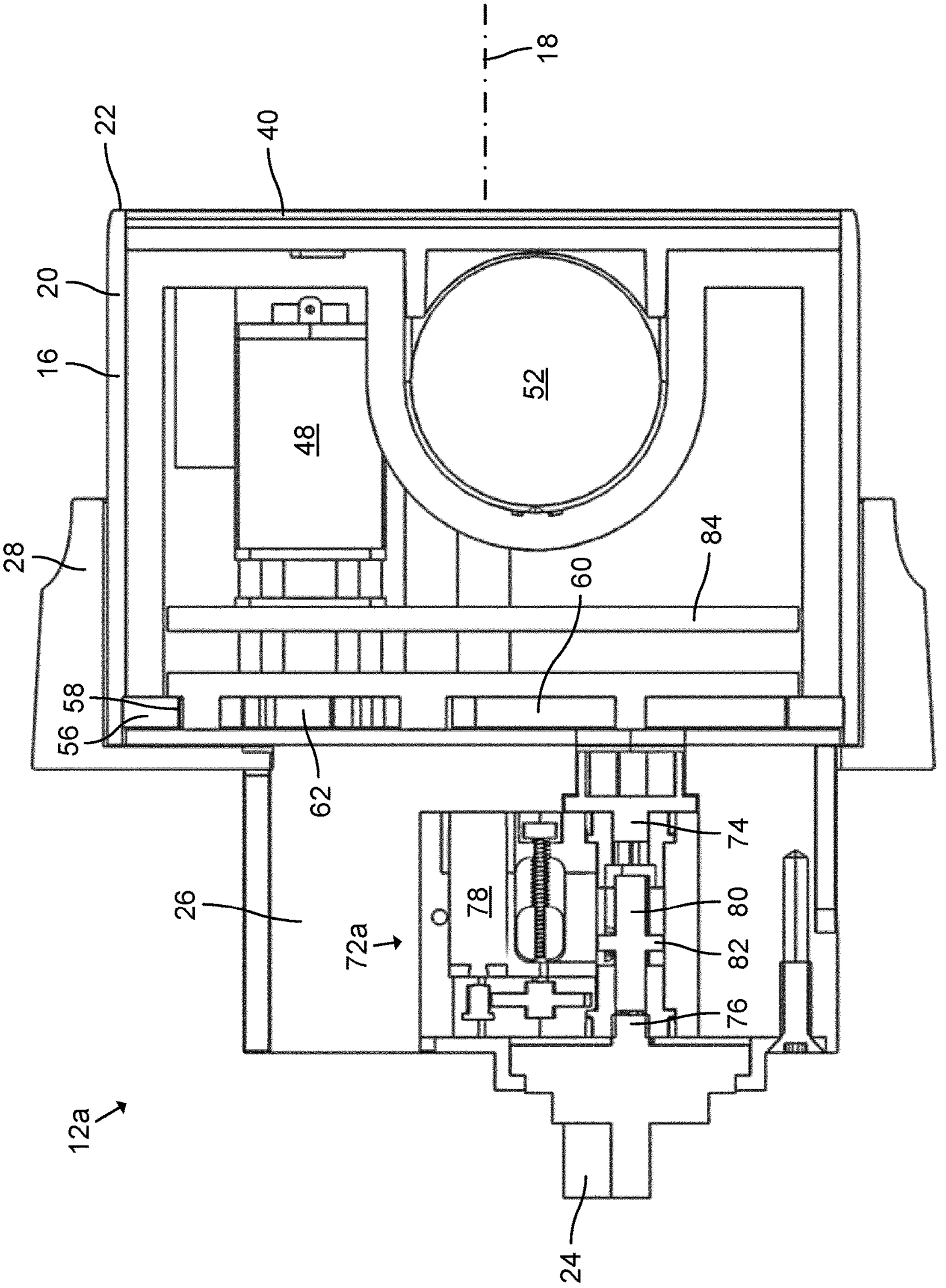
FIG. 5: schematically represents a cross-sectional side view of the actuating device.

FIG. 5 schematically represents a cross-sectional side view of the actuating device 12*a*. As shown in FIG. 5, the ring gear 56 is fixed to a rear end (to the left in FIG. 5) of the knob 20. A diameter of the internal profile 58 is approximately 80% of an external diameter of the knob 20.

The actuating device 12*a* further comprises an electromechanical transfer device 72*a*. The transfer device 72*a* is configured to switch from a disabled state to an enabled state based on the credential input 42 to the credential receiver 40. The transfer device 72*a* is functionally and geometrically arranged between the transfer wheel 60 and the locking member 24. The transfer device 72*a* is here arranged in the lock cylinder 26.

In the disabled state of the transfer device 72*a*, the locking member 24 can not be rotated from the locked position to the unlocked position by means of rotation of the actuating element 16. In this example, the actuating element 16 can however be rotated for energy harvesting when the transfer device 72*a* adopts the disabled state. In the enabled state of the transfer device 72*a*, the locking member 24 can be rotated from the locked position to the unlocked position by means of rotation of the actuating element 16.

The transfer device 72*a* of this example comprises an input element 74, an output element 76. The input element 74 is here fixed to the transfer wheel 60 and the output element 76 is here integrally formed with the locking member 24.

The transfer device 72*a* further comprises an electromechanical actuator 78. By driving the actuator 78, the transfer device 72*a* can be switched between the disabled state and the enabled state. The transfer device 72*a* of this example comprises a coupling shaft 80 having a collar 82.

The actuating device 12*a* further comprises a control system 84, here exemplified as a PCB (printed circuit board) lying in a plane transverse to the actuation axis 18. The control system 84 is arranged inside the actuating element 16, between the ring gear 56 and the generator 48 along the actuation axis 18.

Figure 6:
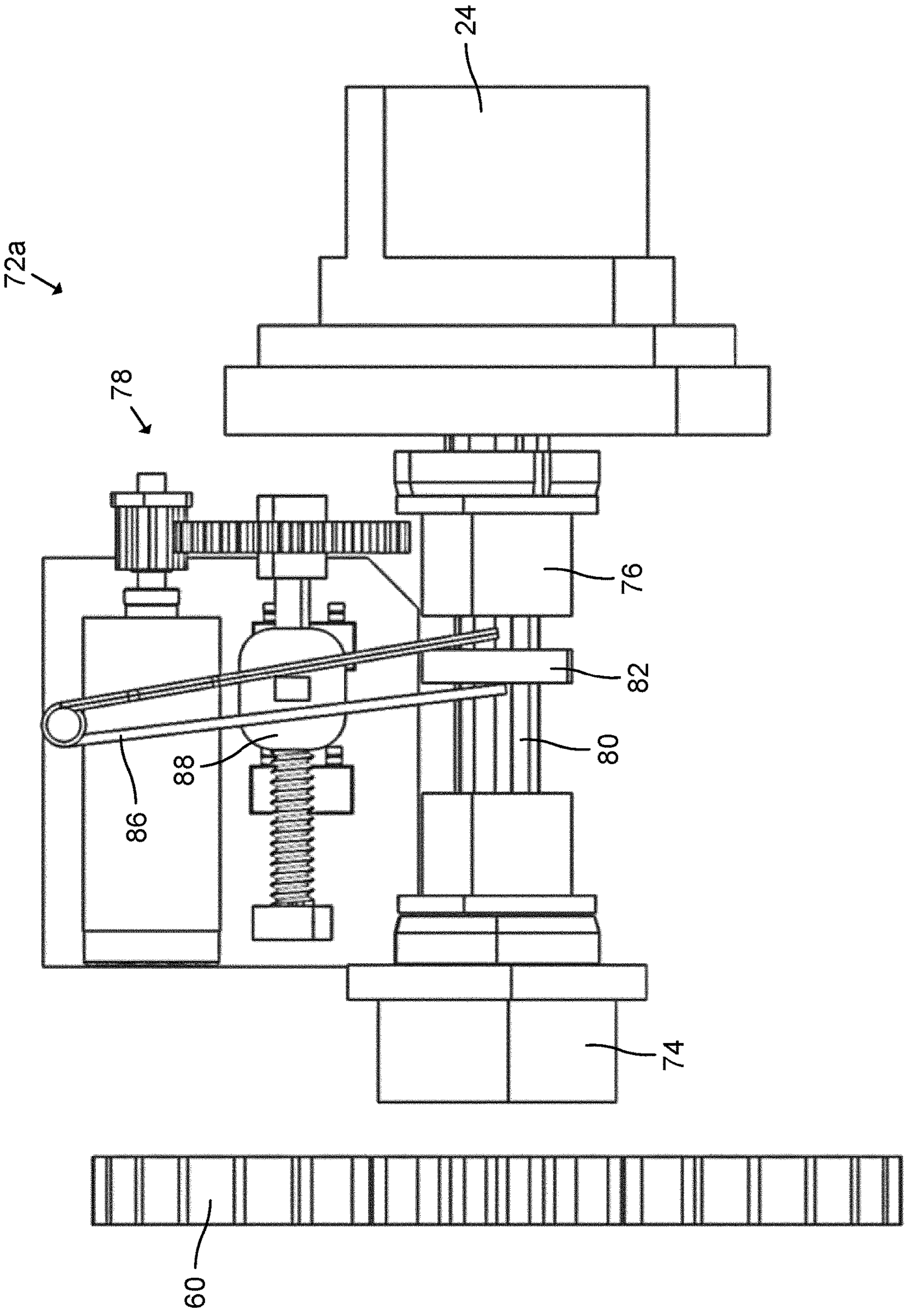
FIG. 6: schematically represents a side view of a transfer device of the actuating device.

FIG. 6 schematically represents a side view of the transfer device 72*a*. The coupling shaft 80 has a polygonal profile. The coupling shaft 80 is always received in the input element 74. In the disabled state, the coupling shaft 80 does not engage in a corresponding polygonal opening of the output element 76. Rotation of the input element 74 is thereby not transmitted to a rotation of the output element 76 and the locking member 24. By driving the actuator 78, the coupling shaft 80 can be moved linearly (to the right in FIG. 6) into the opening of the output element 76. When the coupling shaft 80 enters this opening, rotation of the input element 74 is transmitted by the coupling shaft 80 to a rotation of the output element 76 and the locking member 24.

In this specific example, the transfer device 72*a* comprises a torsion spring 86 and a nut 88. When the actuator 78 drives the nut 88 linearly to the right in FIG. 6, the torsion spring 86 exerts a force on the collar 82. In case the coupling shaft 80 is not aligned with the opening in the output element 76, the actuator 78 can be stopped and the torsion spring 86 continues to exert a force on the coupling shaft 80 to the right. When the input element 74 is rotated such that the coupling shaft 80 becomes aligned with the opening in the output element 76, the torsion spring 86 forces the coupling shaft 80 into the opening. The transfer device 72*a* thereby adopts the enabled state.

Figure 7:
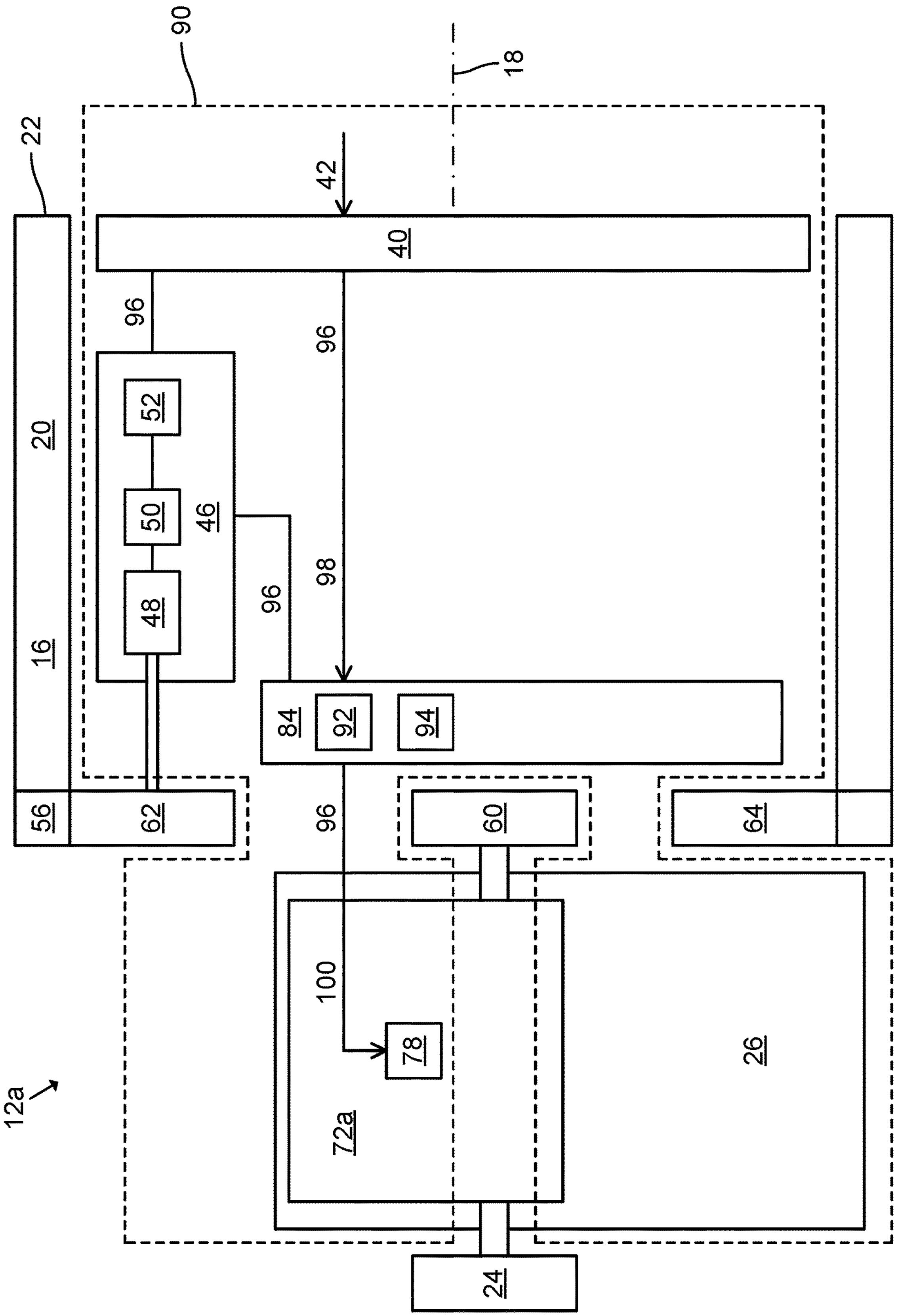
FIG. 7: schematically represents a side view of the actuating device.

FIG. 7 schematically represents a side view of the actuating device 12*a*. In FIG. 7, the stationary structure 90 of the actuating device 12*a* is shown as a volume within dashed lines. As shown, the stationary structure 90 is arranged partly inside the actuating element 16. The credential receiver 40 is here arranged entirely radially inside the knob 20 with respect to the actuation axis 18. Moreover, an entire length of the credential receiver 40 is here arranged radially inside the knob 20 with respect to the actuation axis 18.

When the actuating element 16 is rotated by the user, the actuating element 16 and the wheels 60, 62 and 64 rotate relative to the stationary structure 90. Rotation of the second wheel 62 drives the generator 48 to harvest electric energy. During rotation of the actuating element 16, the credential receiver 40 remains static. This provides an improved user experience and a more consistent interaction between the user and the credential receiver 40.

The control system 84 comprises a data processing device 92 and a memory 94. The memory 94 has a computer program thereon. The computer program comprises program code which, when executed by the data processing device 92 causes the data processing device 92 to perform, or command performance of, various steps as described herein.

The actuating device 12*a* comprises electrical conductors 96 connecting the control system 84 to each of the power source 46, the credential receiver 40 and the actuator 78, and an electrical conductor 96 between the power source 46 and the credential receiver 40. The power source 46 electrically powers the control system 84 and the credential receiver 40. Moreover, the power source 46 here electrically powers the actuator 78 via the control system 84.

As shown in FIG. 7, the credential receiver 40 is configured to send an access signal 98 to the control system 84 in response to the credential input 42. The control system 84 is configured to evaluate the access signal 98, i.e. to determine whether the credential input 42 is valid or invalid. In case the credential input 42 is valid, the control system 84 sends an authorization signal 100 to the actuator 78 to thereby command the transfer device 72*a* to switch from the disabled state to the enabled state. In case the credential input 42 is invalid, the control system 84 does not issue the authorization signal 100.

Figure 8:
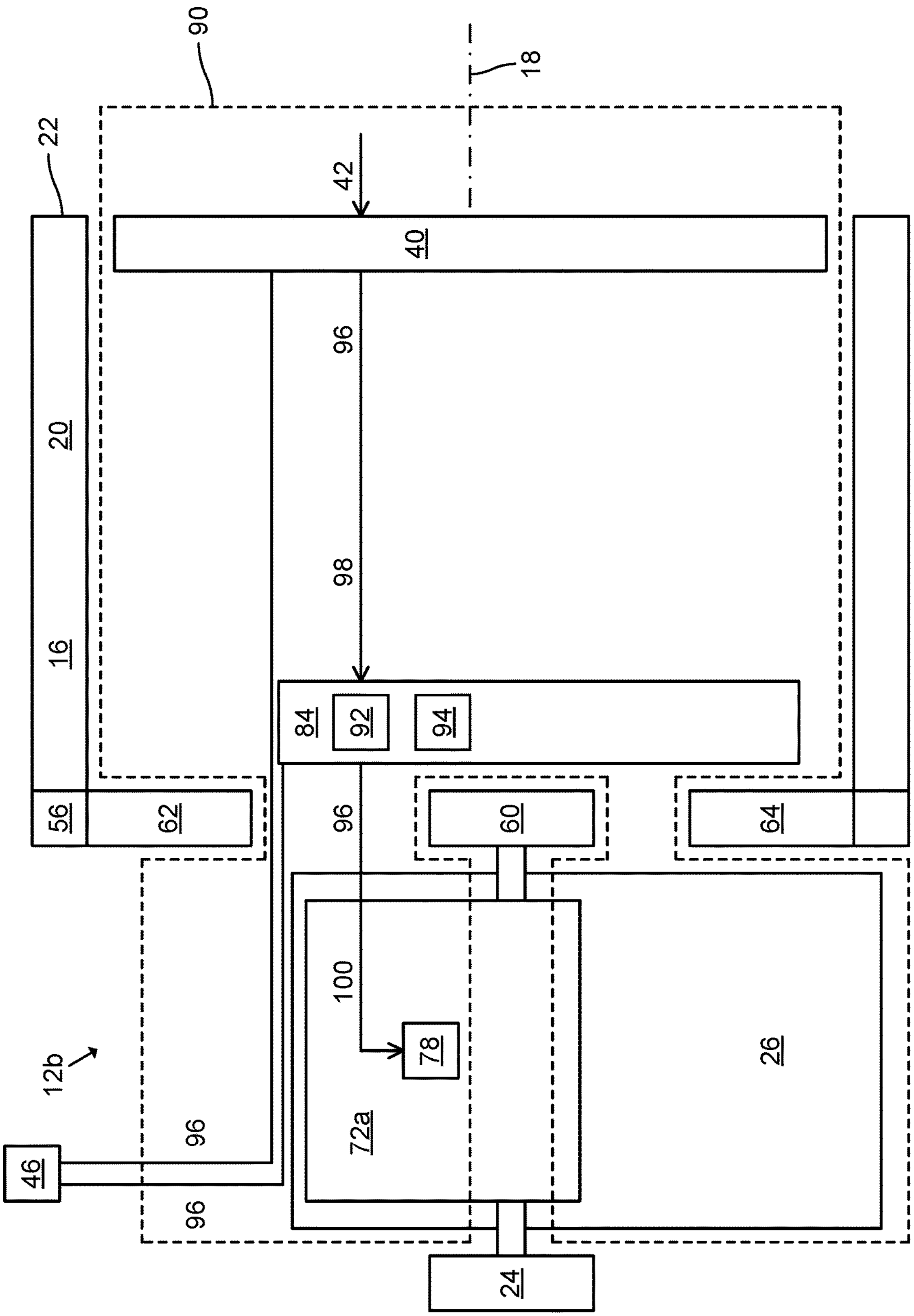
FIG. 8: schematically represents a side view of a further example of an actuating device.

FIG. 8 schematically represents a side view of a further example of an actuating device 12*b*. Mainly differences with respect to the actuating device 12*a* will be described. The actuating device 12*b* does not comprise any electric generator. Instead, the actuating device 12*b* is electrically powered by an external power source 46, such as a mains supply. In the actuating device 12*b*, both the second wheel 62 and the third wheel 64 are support wheels for the actuating element 16. When no power source 46 is provided in the stationary structure 90 inside the actuating element 16, the actuating element 16 can be made even more compact, i.e. shorter along the actuation axis 18. As an alternative to the power source 46 outside the actuating device 12*b*, a power source 46 comprising a battery (but no generator) may be provided in the stationary structure 90 inside the actuating element 16.

Since the actuating element 16 of the actuating device 12*b* does not drive an electric generator, the actuating element 16 does not have to be rotated endlessly around the actuation axis 18. A rotation range of for example 90 degrees about the actuation axis 18 can be sufficient. In this way, more space inside the ring gear 56 can be used for the stationary structure 90.

Furthermore, when the actuating element 16 of the actuating device 12*b* does not drive an electric generator, the actuating element 16 can alternatively be fixed to the input element 74 of the transfer device 72*a*. In this way, each of the wheels 60, 62 and 64 can be omitted.

Figure 9A:
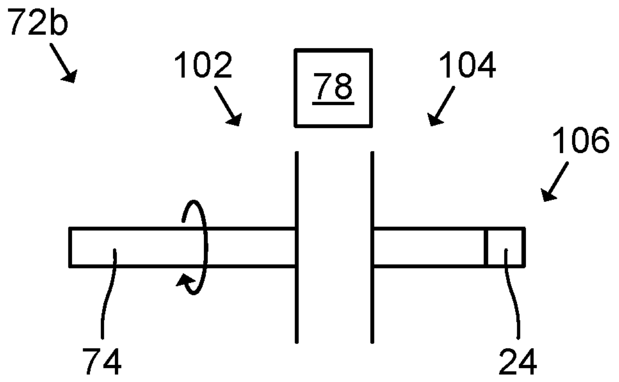
FIG. 9*a*: schematically represents a side view of a further example of a transfer device in a disabled state.

FIG. 9*a* schematically represents a side view of a further example of a transfer device 72*b*. Similarly to the transfer device 72*a*, the transfer device 72*b* is a coupling device. The transfer device 72*b* comprises a clutch 102 controlled by the actuator 78. In FIG. 9*a*, the clutch 102 is controlled by the actuator 78 to be open. The transfer device 72*b* thereby adopts a disabled state 104. In the disabled state 104, rotation of the input element 74 is not transferred to a rotation of the locking member 24. The locking member 24 thereby remains in a locked position 106.

Figure 9B:
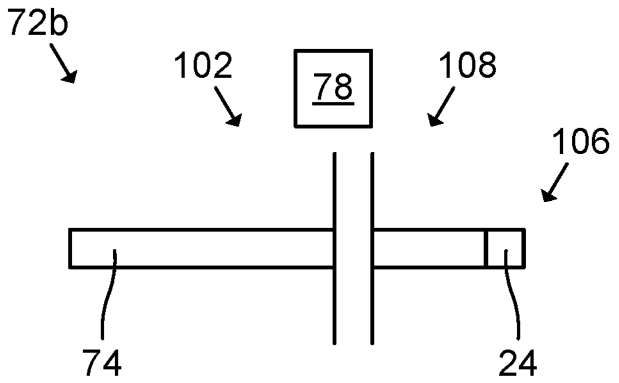
FIG. 9*b*: schematically represents a side view of the transfer device in FIG. 9*a* in an enabled state.

FIG. 9*b* schematically represents a side view of the transfer device 72*b*. In FIG. 9*b*, the clutch 102 is controlled by the actuator 78 to be closed, e.g. in response to the authorization signal 100. The transfer device 72*b* thereby adopts an enabled state 108.

Figure 9C:
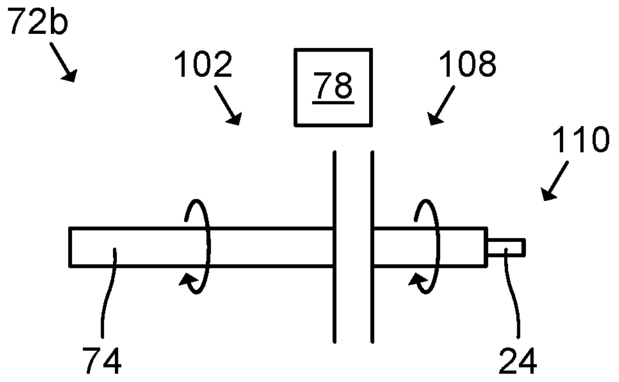
FIG. 9*c*: schematically represents a side view of the transfer device in FIGS. 9*a* and 9*b* when a locking member is rotated by an input element.

FIG. 9*c* schematically represents a side view of the transfer device 72*b*. As shown in FIG. 9*c*, the locking member 24 can be rotated from the locked position 106 to an unlocked position 110 by rotation of the input element 74 when the transfer device 72*b* adopts the enabled state 108.

Figure 10A:
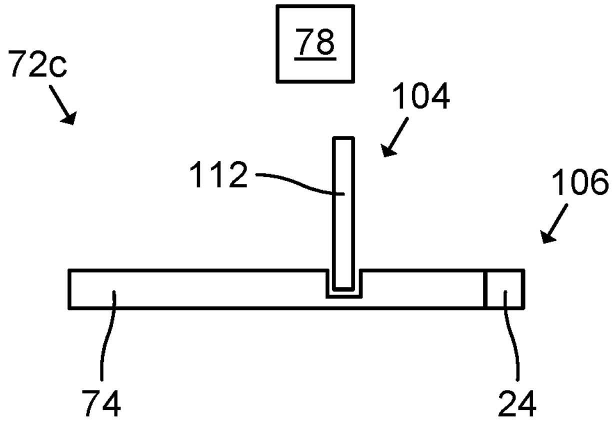
FIG. 10*a*: schematically represents a side view of a further example of a transfer device in a disabled state.

FIG. 10*a* schematically represents a side view of a further example of a transfer device 72*c*. Mainly differences with respect to the transfer device 72*b* will be described. The transfer device 72*c* is a blocking device. Moreover, the input element 74 is fixed to the locking member 24, here integrally formed with the locking member 24.

The transfer device 72*c* comprises a blocking member 112 controlled by the actuator 78. In FIG. 10*a*, the blocking member 112 is controlled by the actuator 78 to engage in a recess in the input element 74. The blocking member 112 blocks rotation of the input element 74 and the locking member 24. The transfer device 72*c* thereby adopts the disabled state 104. In case the actuating device 12*a* and 12*b* comprises the transfer device 72*c*, the actuating element 16 cannot be rotated when the transfer device 72*c* adopts the disabled state 104.

Figure 10B:
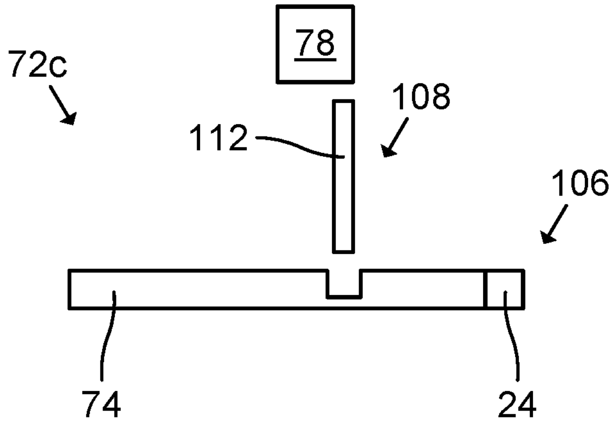
FIG. 10*b*: schematically represents a side view of the transfer device in FIG. 10*a* in an enabled state.

FIG. 10*b* schematically represents a side view of the transfer device 72*c*. In FIG. 10*b*, the blocking member 112 is controlled by the actuator 78 to be retracted from the recess in the input element 74, e.g. in response to the authorization signal 100. The transfer device 72*c* thereby adopts the enabled state 108.

Figure 10C:
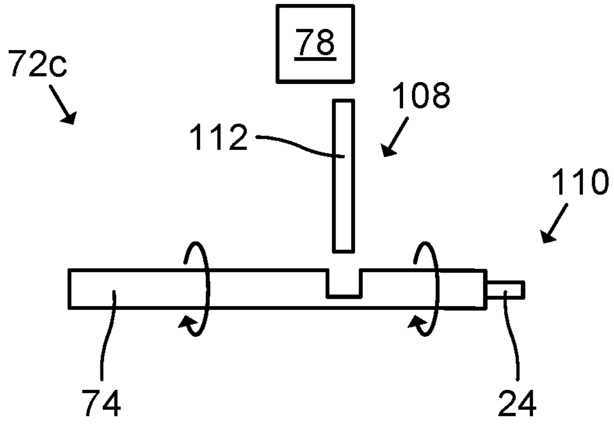
FIG. 10*c*: schematically represents a side view of the transfer device in FIGS. 10*a* and 10*b* when a locking member is rotated by an input element.

FIG. 10*c* schematically represents a side view of the transfer device 72*c*. As shown in FIG. 10*c*, the locking member 24 can be rotated from the locked position 106 to the unlocked position 110 by rotation of the input element 74 when the transfer device 72*c* adopts the enabled state 108.

Figure 11A:
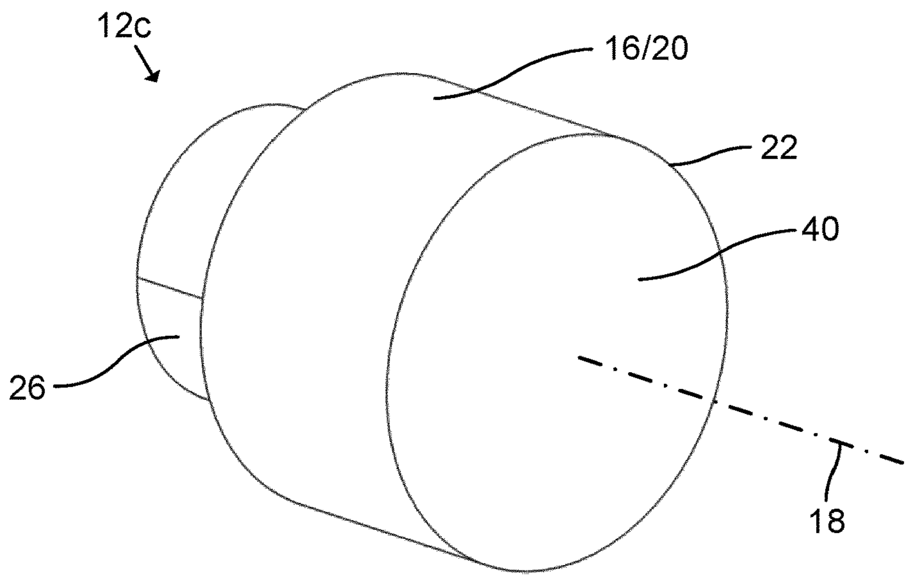
FIG. 11*a*: schematically represents a front perspective view of a further example of an actuating device.
Figure 11B:
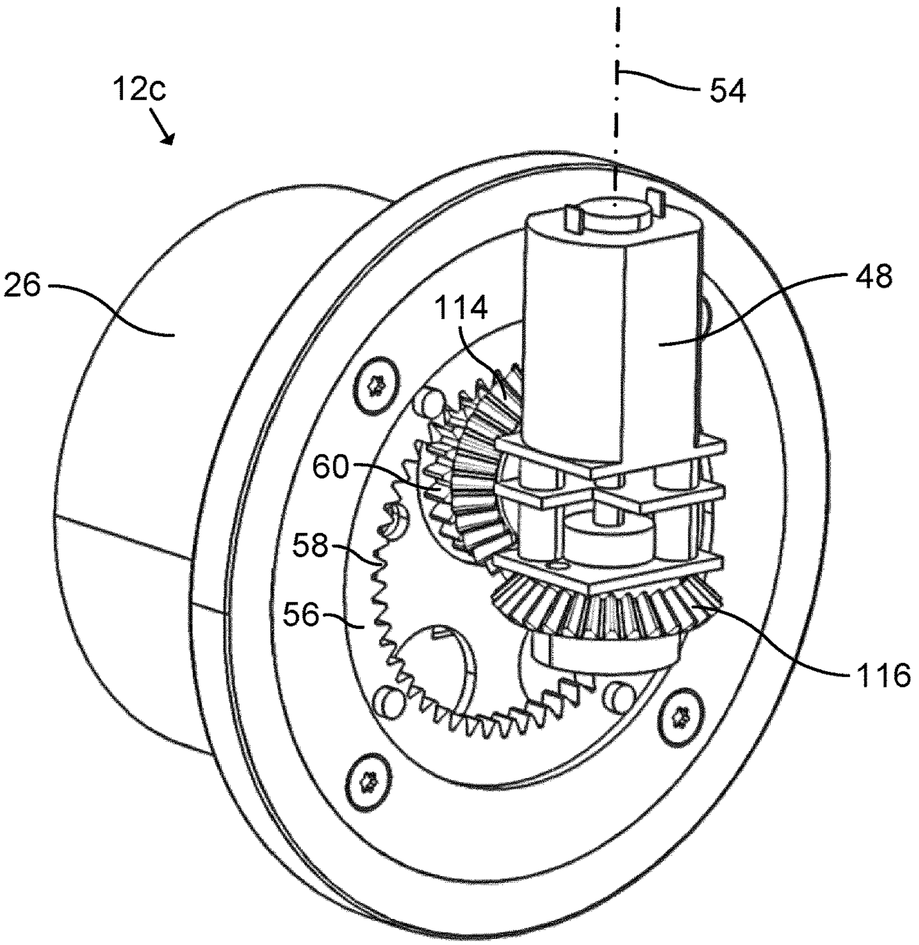
FIG. 11*b*: schematically represents a partial front perspective view of the actuating device in FIG. 11*a*.
Figure 11C:
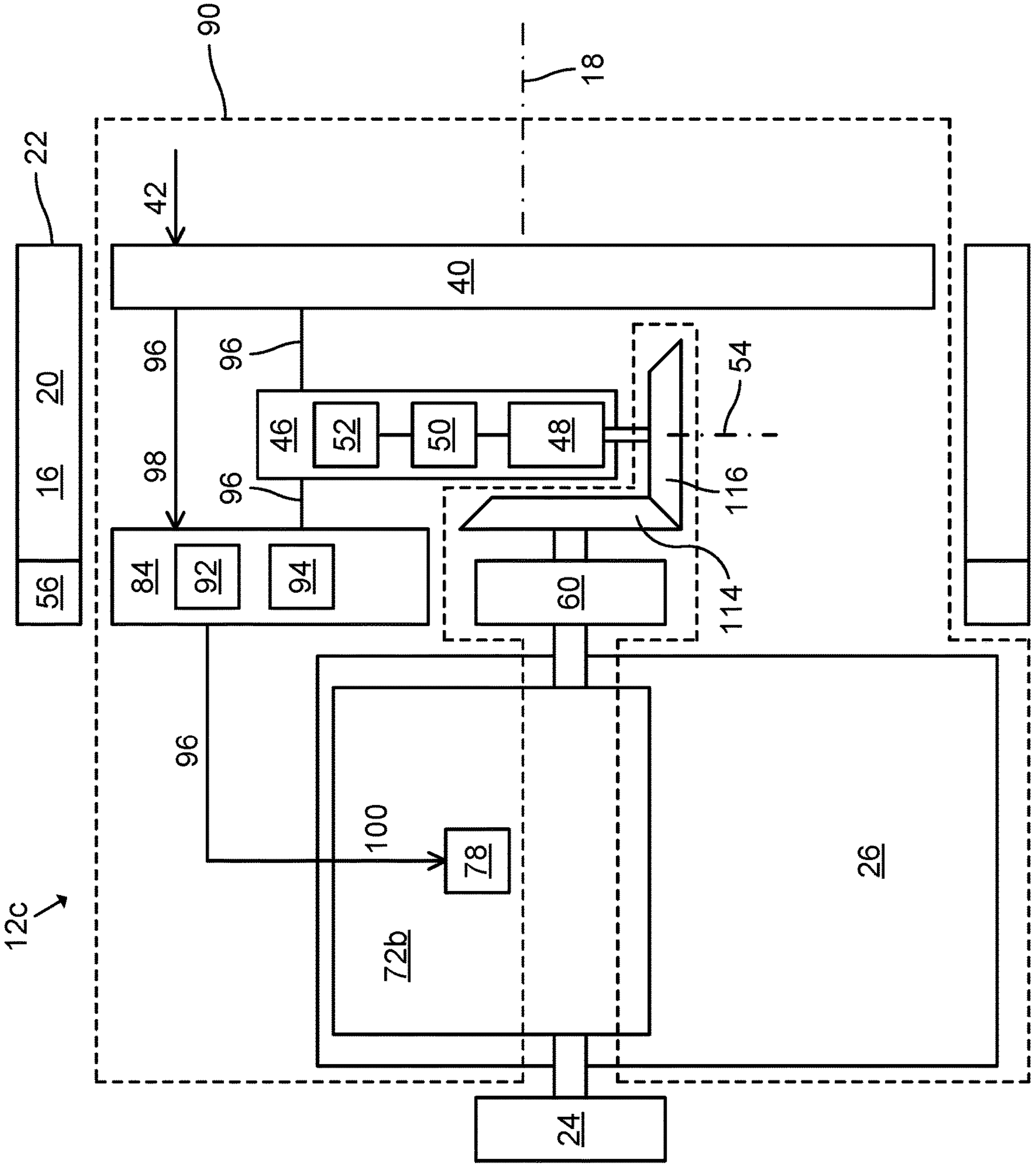
FIG. 11*c*: schematically represents a side view of the actuating device in FIGS. 11*a* and 11*b*.

FIG. 11*a* schematically represents a front perspective view of a further example of an actuating device 12*c*, FIG. 11*b* schematically represents a partial front perspective view of the actuating device 12*c*, and FIG. 11*c* schematically represents a side view of the actuating device 12*c*. With collective reference to FIGS. 11*a*-11*c*, mainly differences with respect to the actuating device 12*a* will be described. The actuating device 12*c* of this example comprises the transfer device 72*c*. The actuating device 12*c* further comprises the transfer wheel 60, but not the second wheel 62 and the third wheel 64. The generator 48 is here driven by the transfer wheel 60. The stationary structure 90 can thereby make use of more space inside the ring gear 56. Alternatively, or in addition, the ring gear 56 (and the knob 20) can be made smaller in a plane transverse to the actuation axis 18.

The generator axis 54 is here oriented perpendicular to the actuation axis 18. This enables the actuating device 12*c* to be made even more compact, i.e. shorter along the actuation axis 18.

The actuating device 12*c* comprises a first bevel gear 114 and a second bevel gear 116 in meshing engagement with the first bevel gear 114. The first bevel gear 114 is driven by the transfer wheel 60. Thus, in the actuating device 12*c*, the transfer wheel 60 drives both the input element 74 and the generator 48.

The first bevel gear 114 is here concentric with the transfer wheel 60. The second bevel gear 116 is concentric with the generator axis 54. A transmission (not shown) may be arranged between the transfer wheel 60 and the first bevel gear 114. Alternatively, the first bevel gear 114 may be fixed to the transfer wheel 60.

The first bevel gear 114 lies in a plane perpendicular to the actuation axis 18 and the second bevel gear 116 lies in a plane parallel with the actuation axis 18. The first bevel gear 114 is larger than the second bevel gear 116. The first bevel gear 114 and the second bevel gear 116 thereby form a speed increasing transmission between the transfer wheel 60 and the generator 48.

As an alternative example, the actuating device 12*c* may comprise the second wheel 62. The first bevel gear 114 may then be driven by the second wheel 62. As a further alternative example, the actuating device 12*c* comprises the second wheel 62 and the third wheel 64 functioning as support wheels.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An actuating device for a lock device, the actuating device comprising:

a stationary structure having a credential receiver for receiving a credential input from a user;

an actuating element rotatable about an actuation axis relative to the stationary structure by direct manipulation by the user, where the stationary structure is arranged at least partly inside the actuating element;

a locking member movable between a locked position and an unlocked position; and an electromechanical transfer device arranged, based on the credential input, to adopt a disabled state in which the locking member cannot be moved from the locked position to the unlocked position by rotation of the actuating element, and an enabled state in which the locking member can be moved from the locked position to the unlocked position by rotation of the actuating element;

wherein the credential receiver is at least partly arranged radially inside the actuating element with respect to the actuation axis;

wherein the actuating device further comprises a transfer wheel rotatable about a transfer axis parallel with the actuation axis, wherein the transfer wheel is positioned radially inside the actuating element with respect to the actuation axis, wherein the transfer wheel is arranged to drive an input element of the transfer device, and wherein the actuating element comprises an internal profile engaging the transfer wheel; and wherein the actuating device further comprises a second wheel rotatable about a second axis and a third wheel rotatable about a third axis, wherein each of the second axis and the third axis is parallel with the actuation axis, wherein each of the second wheel and the third wheel is positioned radially inside the actuating element with respect to the actuation axis, and wherein the internal profile engages each of the second wheel and the third wheel.

2. The actuating device according to claim 1, wherein the input element is rotatable, and wherein the transfer wheel is fixed to, or integrally formed with, the input element.

3. The actuating device according to claim 1, wherein one, several, or all of the transfer wheel, the second wheel, and the third wheel is a gear wheel, and wherein the internal profile comprises an internal gear meshing with the one or more gear wheels.

4. The actuating device according to claim 1, wherein the actuating element comprises a knob.

5. The actuating device according to claim 1, wherein the actuating element comprises a front end, and wherein the credential receiver is substantially aligned with the front end.

6. The actuating device according to claim 1, further comprising a control system configured to issue an authorization signal to the transfer device upon presentation of a valid credential input by the user, and wherein the control system is arranged in the stationary structure.

7. The actuating device according to claim 1, further comprising a power source.

8. The actuating device according to claim 7, wherein the transfer device is arranged to be electrically powered by the power source.

9. The actuating device according to claim 7, wherein the power source is arranged in the stationary structure.

10. The actuating device according to claim 7, wherein the power source comprises an electric generator arranged to be driven by rotation of the actuating element to thereby generate electric energy.

11. The actuating device according to claim 10, wherein the input element is rotatable, wherein the transfer wheel is fixed to, or integrally formed with, the input element, and wherein the generator is arranged to be driven by rotation of the transfer wheel.

12. The actuating device according to claim 10, wherein the generator comprises a generator axis, and wherein the generator axis is angled 30 degrees to 150 degrees to the actuation axis.

13. A lock device comprising an actuating device according to claim 1.

14. The actuating device according to claim 8, wherein the power source is arranged in the stationary structure.

15. The actuating device according to claim 8, wherein the power source comprises an electric generator arranged to be driven by rotation of the actuating element to thereby generate electric energy.

16. The actuating device according to claim 9, wherein the power source comprises an electric generator arranged to be driven by rotation of the actuating element to thereby generate electric energy.

17. The actuating device according to claim 11, wherein the generator comprises a generator axis, and wherein the generator axis is angled 30 degrees to 150 degrees to the actuation axis.

* * * * *